United States Patent
Nagy et al.

(10) Patent No.: US 6,812,183 B1
(45) Date of Patent: Nov. 2, 2004

(54) TRIPLE-DECKER CATALYSTS BASED ON DELOCALIZED DIANIONIC LIGANDS

(75) Inventors: Sandor Nagy, Naperville, IL (US); Joel A. Mutchler, Morris, IL (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/421,062

(22) Filed: Apr. 23, 2003

(51) Int. Cl.$^7$ ............................ B01J 31/00; B01J 37/00; C08F 4/02; C08F 4/60
(52) U.S. Cl. ...................... 502/103; 502/113; 502/117; 526/127; 526/134; 526/141; 556/11
(58) Field of Search ................................ 502/103, 113, 502/117; 526/127, 134, 141; 556/11

(56) References Cited

U.S. PATENT DOCUMENTS

| | | | |
|---|---|---|---|
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,539,124 A | 7/1996 | Etherton et al. | 548/402 |
| 5,637,659 A | 6/1997 | Krishnamurti et al. | 526/133 |
| 5,648,440 A | 7/1997 | Sugano et al. | 526/132 |
| 5,902,866 A | 5/1999 | Nagy et al. | 526/133 |
| 6,140,432 A * | 10/2000 | Agapiou et al. | 526/141 |
| 6,211,311 B1 | 4/2001 | Wang et al. | 526/131 |
| 6,262,197 B1 * | 7/2001 | Aulbach et al. | 526/127 |
| 6,414,162 B1 | 7/2002 | Nagy | 548/406 |
| 6,433,203 B1 * | 8/2002 | Dall'occo et al. | 556/11 |
| 6,642,400 B2 * | 11/2003 | Holtcamp et al. | 556/11 |
| 6,686,306 B2 * | 2/2004 | Shih | 502/113 |
| 6,723,794 B2 * | 4/2004 | Kawasaki et al. | 525/213 |

OTHER PUBLICATIONS

Copending U.S. application 10/308842.*
Copending U.S. application 10/421077.*
K. Reddy et al., *Organometallics 8* (1989) 2107.
J. Lauher et al., *J. Am. Chem. Soc. 98* (1976) 3219.
S. Kolesnikov et al., *J. Am. Chem. Soc. 100* (1978) 999.
J. Moraczewski et al., *J. Am. Chem. Soc. 100* (1978) 7429.
H. Werner, *Angew. Chem., I.E. Engl. 16* (1977) 1.
Y. Mizuno et al., *J. Am. Chem. Soc. 122* (2000) 5278.
G. Rodriguez et al., *J. Am. Chem. Soc. 119* (1997) 343.
T. Katz, *J. Am. Chem. Soc. 82* (1960) 3784.
J. Oth et al., *J. Chem. Soc. B* (1971) 904.
N. Bauld et al., *J. Am. Chem. Soc. 87* (1965) 128.
M. Dewar et al., *J. Am. Chem. Soc. 87* (1965) 5508.
G. Bazan et al., *J. Am. Chem. Soc. 116* (1994) 2177.
M–E Gunther et al., *Chem. Ber. 117* (1984) 1069.
R. Pettit et al., *Org. Synth. 50* (1970) 21, 37.
G. Emerson et al., *J. Am. Chem. Soc. 87* (1965) 131.
J. Barborak et al., *J. Am. Chem. Soc. 89* (1967) 3080.

* cited by examiner

Primary Examiner—Mark L. Bell
Assistant Examiner—Jennine M. Brown
(74) Attorney, Agent, or Firm—John Tyrell; Jonathan L. Schuchardt

(57) ABSTRACT

Catalysts useful for polymerizing olefins are disclosed. The catalysts comprise an activator and a triple-decker bimetallic complex. The complex includes two Group 3–10 transition metals and a delocalized dianionic ligand that is pi-bonded to each of the metals. The behavior of the catalysts can be modified by choice of each metal, by the choice of the dianionic ligand, or by choice of the ancillary ligands. The invention provides a new way to make a large variety of catalyst systems.

11 Claims, No Drawings

US 6,812,183 B1

TRIPLE-DECKER CATALYSTS BASED ON DELOCALIZED DIANIONIC LIGANDS

FIELD OF THE INVENTION

The invention relates to catalyst systems that include triple-decker bimetallic complexes having a delocalized dianionic ligand. The catalysts are useful for polymerizing olefins.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they often produce polymers with improved physical properties.

Since the mid-1980s, scientists have become increasingly interested in bimetallic metallocenes, and in particular, how two metal centers communicate with each other via electronic and through-space interactions (see, e.g., Reddy et al. *Organometallics* 8 (1989) 2107). Cooperative effects are most likely when the two metal centers are electronically coupled through a conjugated pi-electron system. Ultimately, understanding cooperative effects should let polyolefin manufacturers fine-tune polymer properties by varying catalyst structure.

U.S. Pat. No. 6,414,162 describes bimetallic complexes that derive from dianionic indenoindolyl ligands. These complexes can include two metals bonded to the dianionic indenoindolyl ligand. While one of the anions is delocalized and provides pi bonding to a metal, the other is on the nitrogen atom and provides sigma bonding to the second metal. Pending application Ser. No. 10/308,842, filed Dec. 3, 2002, discloses a bimetallic complex with two linked indenoindolyl groups.

Triple-decker complexes, where two metals have a ligand between them that can provide pi bonding, have been known since the late 1970s (see, e.g., *J. Am. Chem. Soc.* 98 (1976) 3219; *J. Am. Chem. Soc.* 100 (1978) 999; *J. Am. Chem. Soc.* 100 (1978) 7429 and *Angew. Chem., Int. Ed. Engl.* 16 (1977) 1), but there has been no indication that these complexes might be suitable for polymerizing olefins.

Delocalized dianionic ligands are known. In *J. Am. Chem. Soc.* 122 (2000) 5278, a series of various porphyrins are synthesized. Trimethylenemethane based ligands have been used (*J. Am. Chem. Soc.* 119 (1997) 343) to prepare monometallic zirconium complexes and it was demonstrated that these complexes could be used to polymerize ethylene. Other delocalized dianionic ligands are reported in *J. Am. Chem. Soc.* 122 (2000) 5278; *J. Am. Chem. Soc.* 119 (1997) 343; *J. Am. Chem. Soc.* 82 (1960) 3784; *J. Chem. Soc. Part B* (1971) 904; *J. Am. Chem. Soc.* 87 (1965) 128; ibid., 5508 and *Chem. Ber.* 117(1984) 1069.

Despite the considerable work that has been done in the area of olefin polymerization, there is a need for improved catalysts. Because of the wide variety of polyolefin end uses, there is also a need for catalysts that can be easily modified to give polyolefins with different property profiles.

SUMMARY OF THE INVENTION

The invention relates to catalysts which comprise an activator and a triple-decker bimetallic complex. The complex includes two Group 3–10 transition metals and a delocalized dianionic ligand pi-bonded to each of the metals. Finally, the complex includes two or more ancillary ligands bonded to each metal that satisfy the valence of the metals.

Catalysts of the invention are versatile. The use of two metals gives an extra dimension for modification of the catalysts. The behavior of the catalysts can be modified by choice of each metal, by the choice of the dianionic ligand or by choice of the ancillary ligands. The invention provides a new way to make a large variety of catalyst systems. As end uses continue to evolve that require new and different polyolefins, it is valuable to have a catalyst system that can be easily modified.

DETAILED DESCRIPTION OF THE INVENTION

Catalysts of the invention comprise an activator and a bimetallic complex. The complex includes two metal atoms, which may be the same or different, from Groups 3–10. Preferably, the complexes include two Group 4–6 transition metals. Most preferred are complexes that include two Group 4 transition metal atoms, such as titanium or zirconium.

The bimetallic complex also includes a delocalized dianionic ligand pi bonded to each of the metals and two or more ancillary ligands bonded to each metal that satisfy the valence of the metals. The two metals are bonded to, and separated from each other by, the delocalized dianionic ligand. One route to catalyst deactivation can be the interaction of the metals. This separation of the two metals by the dianionic ligand helps to prevent intramolecular deactivation.

The dianionic ligand is delocalized. By "delocalized," we mean that the two negative charges of the dianion are distributed over a planar or substantially planar system of several or many atoms, preferably a conjugated system of pi-electrons. Exemplary delocalized dianionic ligands are:

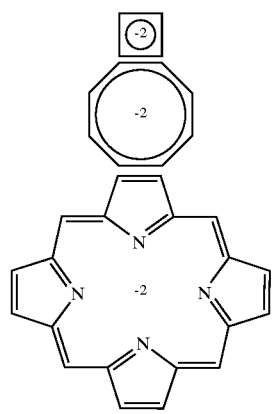

-continued

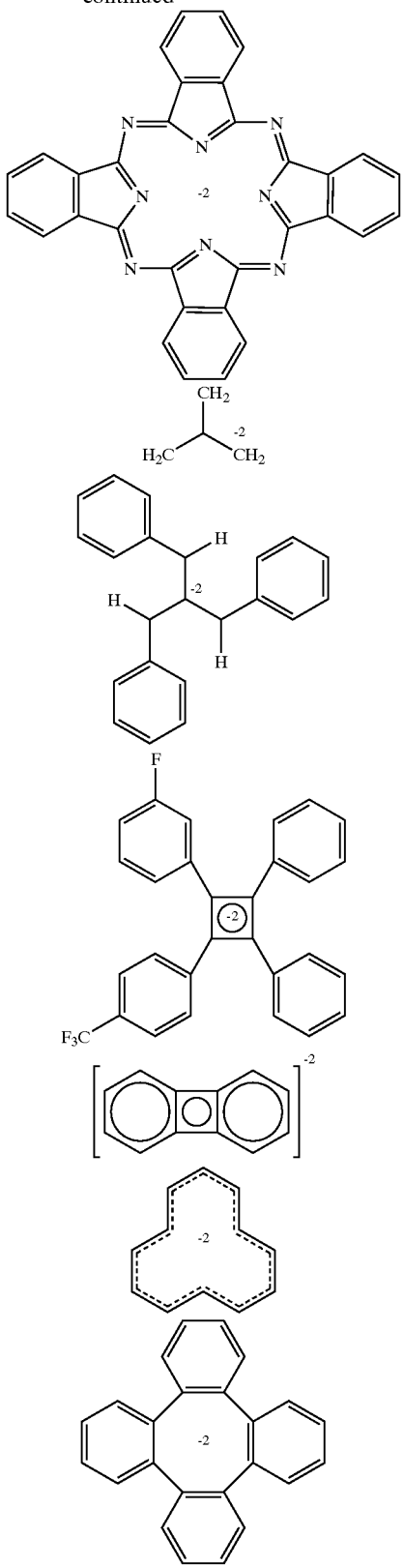

Preferred dianions include the trimethylenemethane dianion, cyclobutadiene dianion, cyclooctatetraene dianion, porphyrin dianion, biphenylene dianion, tetraphenylene dianion, [12]annulene dianion, and phthalocyanine dianion.

The trimethylenemethane dianion and cyclobutadiene dianion are especially preferred (see modeling calculations, Tables 1 and 2).

Delocalized dianionic ligands can be made by well-known synthetic paths. In *J. Am. Chem. Soc.* 122 (2000) 5278, a series of various porphyrins are synthesized. Trimethylenemethane-based ligands have been used (*J. Am. Chem. Soc.* 119 (1997) 343) to prepare monometallic zirconium complexes. Boat-shaped cyclooctatetraene is readily converted to a planar 10-pi electron dianion by a two-electron reduction with an alkali metal (*J. Am. Chem. Soc.* 82 (1960) 3784). Similarly, the planar 14-pi electron dianion from [12]annulene has been reported (*J. Chem. Soc. Part B* (1971) 904). The biphenylene dianion has also been generated (*J. Am. Chem. Soc.* 87 (1965) 128; ibid. 5508; *Chem. Ber.* 117 (1984) 1069). Cyclobutadiene, a short-lived compound at best, can nonetheless be generated by exposing cyclobutadieneiron tricarbonyl (see *Org. Synth.* 50 (1970) 21, 37) to lead tetraacetate or ceric ammonium nitrate (see *J. Am. Chem. Soc.* 87 (1965) 131, 3253; 89 (1967) 3080).

In addition to the delocalized dianionic ligand, the bimetallic complex includes ancillary ligands that are bonded to each metal. Each metal has two or more neutral or anionic ancillary ligands that satisfy the valence of the metals. The ancillary ligands can be labile or polymerization-stable, but usually at least one labile ligand (such as halides, alkoxys, aryloxys, alkyls, alkaryls, aryls, dialkylaminos, or the like) is present. Particularly preferred labile ligands are halides, alkyls, and alkaryls (e.g., chloride, methyl, benzyl). Suitable polymerization-stable ligands include cyclopentadienyl, indenyl, fluorenyl, boraaryl, pyrrolyl, indenoindolyl, and the like.

Preferably, the bimetallic complex has the structure:

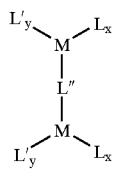

wherein each M is independently a Group 3 to 10 transition metal, each L is independently selected from the group consisting of halide, alkoxy, siloxy, alkylamino, and $C_1$–$C_{30}$ hydrocarbyl; each L' is selected from the group consisting of substituted or unsubstituted cyclopentadienyl, fluorenyl, indenyl, boraaryl, pyrrolyl, azaborolinyl, and indenoindolyl; L" is a delocalized dianionic ligand; y is 0 or 1; and (x+y)−1 satisfies the valence of M.

Exemplary structures:

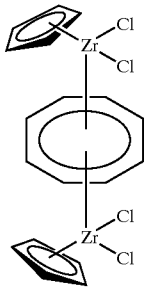

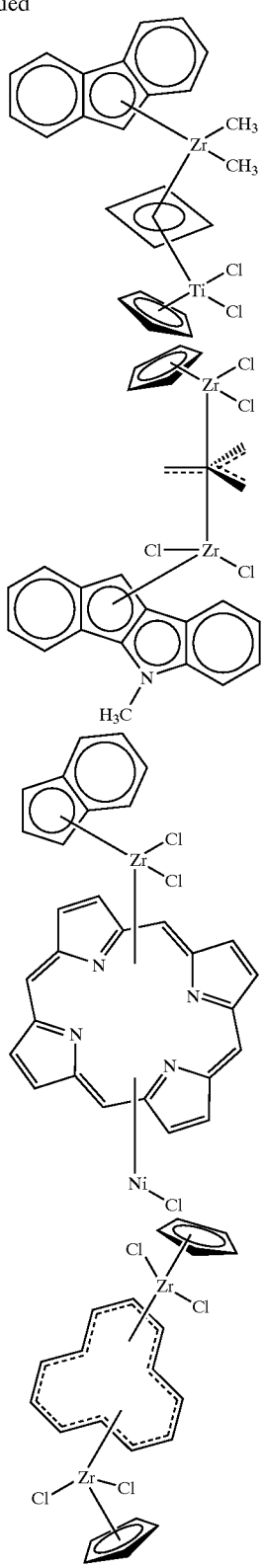

Any convenient source of the transition metal can be used to make the bimetallic complex. The transition metal source conveniently has labile ligands such as halide or dialkylamino groups that are easily displaced by indenoindolyl anions. Examples are halides (e.g., $TiCl_4$, $ZrCl_4$), alkoxides, amides, and the like. In order to make a bimetallic complex, preferably, two or more., equivalents of transition metal source are reacted with 1 equivalent of dianion. When the complex is to include additional polymerization-stable ligands, it is convenient if they are already present on the transition metal source. For example, cylopentadienylzirconium trichloride or fluorenyltitanium trichloride could be used as the transition metal source and reacted with the dianion if a cyclopentadienyl or fluorenyl ligand were desired in the bimetallic complex.

Catalysts of the invention include, in addition to the bimetallic complex, an activator. The activator helps to ionize the bimetallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethyl-aluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl)-borate, lithium tetrakis(pentafluorophenyl)aluminate, anilinium tetrakis (pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference. Alumoxane activators, such as MAO, are preferred.

The optimum amount of activator needed relative to the amount of bimetallic complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per total moles of transition metal, M. When the activator is an organoborane or an ionic borate or aluminate, the amount used will be within the range of about 0.01 to about 5000 moles, preferably from about 0.1 to about 500 moles, of activator per mole of M. The activator can be combined with the complex and added to the reactor as a mixture, or the components can be added to the reactor separately.

The catalyst can be used with a support such as silica, alumina, titania, or the like. Silica is preferred. The support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference.

The catalyst is particularly valuable for polymerizing olefins. Preferred olefins are ethylene and $C_3$–$C_{20}$ α-olefins such as propylene, 1-butene, 1-hexene, 1-octene, and the like. Mixtures of olefins can be used. Ethylene and mixtures of ethylene with $C_3$–$C_{10}$ α-olefins are especially preferred.

A wide variety of olefin polymerization processes can be used. Preferred processes are slurry, bulk, solution, and gas-phase processes. A slurry or gas-phase process is preferably used. Suitable methods for polymerizing olefins using the catalysts of the invention are described, for example, in U.S. Pat. Nos. 5,902,866, 5,637,659, and 5,539,124, the teachings of which are incorporated herein by reference.

The polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 0.1 MPa to about 350 MPa. More preferred is the range from about 0.1 MPa to about 7 MPa.

Catalyst concentrations used for the olefin polymerization depend on many factors. Preferably, however, the concentration ranges from about 0.01 micromoles per liter to about 100 micromoles per liter. Polymerization times depend on the type of process, the catalyst concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

Lithium metal (13.9 mg; 2 mmol) is added to 10 mL of dry hexane in a round bottom flask equipped with dry ice condenser. The solution is cooled with a dry ice bath and 104 mg (1 mmol) cyclooctatetraene is added to the stirring solution. The mixture is stirred for 6 hours and warmed to room temperature. It is then added via cannula to a stirring mixture of 525 mg (2 mmol) of cyclopentadienylzirconium trichloride in tetrahydrofuran. The mixture is stirred 6 hours at room temperature and volatiles removed in vacuo. The residue is extracted with toluene to give a solution of the organometallic complex. This solution can be used "as is" for polymerizing olefins. The expected product is the bimetallic complex

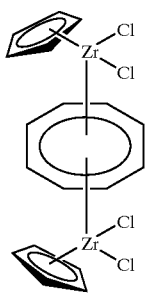

1

EXAMPLE 2

Ethylene Polymerization

A one-liter, stainless-steel reactor is charged with toluene (500 mL) and polymethalumoxane (2.2 mL of 4.14 M solution of PMAO in toluene, Al/Ti=2000). The reactor is charged with ethylene to 350 psig, and the contents are heated to 70° C. An aliquot of the toluene solution of the bimetallic complex 1 (containing 1.0 mg of complex) from Example 1 is injected into the reactor to start the polymerization. Ethylene is supplied on demand to keep the reactor pressure constant at 350 psig. After about 1 hour, the reactor is vented. The resulting product should be polyethylene.

MOLECULAR MODELING STUDY

Additional evidence for the suitability of triple-decker bimetallic complexes with delocalized dianions as ligands for catalysts comes from molecular modeling studies. All calculations have been performed with complete geometry optimization using the DFT model B3LYP with the LACVP** pseudopotential basis set as incorporated into the TITAN™ software package.

To estimate the effect of ligands (L and L') on the relative stability of the zirconocenium active sites, we are using the relative enthalpy ($\Delta\Delta H_f$) of the reaction:

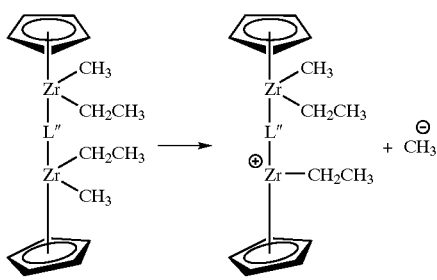

compared with the enthalpy of a standard process in which the zirconium is bonded to two cyclopentadienyl ligands:

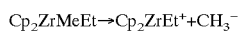

$Cp_2ZrMeEt \rightarrow Cp_2ZrEt^+ + CH_3^-$

According to these estimates (Table 1), the cyclobutadienyl, cyclooctatatetraenyl and trimethylenemethyl dianionic ligands should stabilize an electrophilic active site more effectively compared with a cyclopentadienyl ligand.

TABLE 1

| Complex | $\Delta\Delta H_f$, kcal/mole |
| --- | --- |
| $Cp_2ZrMeEt$ | 0 |
| L" = cyclobutadienyl dianion | −3 |
| L" = cyclooctatetraenyl dianion | −10 |
| L" = trimethylenemethyl dianion | −5 |

The increased stability of the active site for the bimetallic complexes with dianionic ligands permits a high concentration of active sites in the polymerization process, which should result in a more active catalyst at low levels of expensive activator such as MAO.

The increased stability of the zirconocenium cation in the triple-decker complexes should have relatively little impact on its reactivity toward ethylene as characterized by the calculated heat of interaction upon pi-complexation (Table 2). The calculations predict about the same reactivity as the bis(Cp) control case for both the cyclobutadienyl dianion and the trimethylenemethyl dianion. Bimetallic complexes from the dianionic cyclooctatetraene ligand should be somewhat less reactive (8 kcal/mol) compared with the control case.

TABLE 2

| Active site | Relative heat of interaction of active site with ethylene, kcal/mol |
|---|---|
| Cp$_2$ZrEt+ | 0 |
| L" = cyclobutadienyl dianion | −1 |
| L" = cyclooctatetraenyl dianion | 8 |
| L" = trimethylenemethyl dianion | 0 |

The preceding examples are meant only as illustrations. The following claims define the invention.

We claim:

1. A catalyst which comprises:
   (a) an activator; and
   (b) a bimetallic complex which comprises:
      (i) two Group 3 to 10 transition metals, which may be the same or different;
      (ii) a delocalized dianionic ligand pi-bonded to each of the metals; and
      (iii) two or more ancillary ligands bonded to each metal that satisfy the valence of the metals.

2. The catalyst of claim 1 wherein the activator is selected from the group consisting of alumoxanes, alkylaluminum compounds, organoboranes, ionic borates, ionic aluminates and aluminoboronates.

3. The catalyst of claim 1 comprising a Group 4 transition metal.

4. The catalyst of claim 1 wherein the bimetallic complex has the structure:

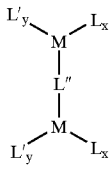

wherein each M is independently a Group 3 to 10 transition metal; each L is independently selected from the group consisting of halide, alkoxy, siloxy, alkylamino, and C$_1$–C$_{30}$ hydrocarbyl; each L' is selected from the group consisting of substituted or unsubstituted cyclopentadienyl, fluorenyl, indenyl, boraaryl, pyrrolyl, azaborolinyl, and indenoindolyl; L" is a delocalized dianionic ligand; y is 0 or 1; and (x+y)−1 satisfies the valence of M.

5. The catalyst of claim 4 wherein L" is a cyclic conjugated dianionic ligand having the following structure:

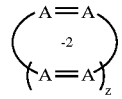

wherein each A is independently a substituted or unsubstituted carbon, nitrogen or phosphorus atom and z is an odd integer from 1 to 19.

6. The catalyst of claim 5 wherein L" is selected from the group consisting of cyclobutadiene dianion, cyclooctatetraene dianion, biphenylene dianion, tetraphenylene dianion, [12]annulene dianion, porphyrin dianion and phthalocyanine dianion.

7. The catalyst of claim 6 wherein L" is a cyclobutadiene dianion.

8. The catalyst of claim 4 wherein L" is a trimethylenemethane dianion.

9. A supported catalyst of claim 1.

10. A process which comprises polymerizing an olefin in the presence of the catalyst of claim 1.

11. The process of claim 10 which comprises copolymerizing ethylene with a C$_3$–C$_{10}$ alpha-olefin.

* * * * *